United States Patent
Bograd et al.

(10) Patent No.: US 11,203,972 B2
(45) Date of Patent: Dec. 21, 2021

(54) GAS TURBINE AND METHOD OF OPERATING THE SAME

(71) Applicant: DOOSAN HEAVY INDUSTRIES & CONSTRUCTION CO., LTD., Changwon-si (KR)

(72) Inventors: Alexander Bograd, Changwon-si (KR); Borys Shershnyov, Changwon-si (KR)

(*) Notice: Subject to any disclaimer, the term of this patent is extended or adjusted under 35 U.S.C. 154(b) by 333 days.

(21) Appl. No.: 16/270,598

(22) Filed: Feb. 8, 2019

(65) Prior Publication Data
US 2019/0277193 A1 Sep. 12, 2019

(30) Foreign Application Priority Data
Mar. 7, 2018 (KR) .................. 10-2018-0026856

(51) Int. Cl.
*F02C 3/30* (2006.01)
*F23R 3/28* (2006.01)
(Continued)

(52) U.S. Cl.
CPC .................. *F02C 3/30* (2013.01); *F02C 6/08* (2013.01); *F02C 7/141* (2013.01); *F23R 3/286* (2013.01);
(Continued)

(58) Field of Classification Search
CPC .... F02C 3/30; F02C 6/08; F02C 7/141; F02C 7/185; F02C 3/305; F02C 9/18;
(Continued)

(56) References Cited

U.S. PATENT DOCUMENTS 3,747,336 A * 7/1973 Dibelius ................. F23L 7/005
60/39.55
5,271,216 A * 12/1993 Frutschi .................... F02C 3/32
60/39.45
(Continued)

FOREIGN PATENT DOCUMENTS

JP 2013-117209 A 6/2013
JP 6071679 B2 2/2017
KR 10-1273563 B1 6/2013

OTHER PUBLICATIONS

A Korean Office Action dated May 2, 2019 in connection with Korean Patent Application No. 10-2018-0026856 which corresponds to the above-referenced U.S. application.
(Continued)

Primary Examiner — Gerald L Sung
Assistant Examiner — Rene D Ford
(74) Attorney, Agent, or Firm — Harvest IP Law, LLP (57) ABSTRACT

The gas turbine includes a compressor to compress air introduced thereinto, a combustor to mix the compressed air with fuel for combustion, a main turbine having a plurality of turbine blades rotated by an energy produced by combustion gas in the combustor, a heat recovery boiler to produce steam by heat exchange with the combustion gas, and a fluid accelerator supplied with a first fluid compressed in the compressor to compress the first fluid and supply the compressed first fluid to the combustor, where the fluid accelerator includes a first inlet through which the first fluid is introduced, a second inlet through which a second fluid having a higher pressure than the first fluid is introduced, and an outlet through which the first and second fluids are mixed and discharged.

12 Claims, 8 Drawing Sheets

(51) Int. Cl.
*F02C 6/08* (2006.01)
*F02C 7/141* (2006.01)
*F02C 7/18* (2006.01)

(52) U.S. Cl.
CPC ........ *F02C 7/185* (2013.01); *F05D 2260/212* (2013.01); *F05D 2260/2322* (2013.01); *F05D 2260/601* (2013.01)

(58) Field of Classification Search
CPC .... F23R 3/286; F23R 3/005; F05D 2260/601; F05D 2260/23222; Y02T 50/60; F01D 25/12; F22B 1/1815
See application file for complete search history.

(56) References Cited

U.S. PATENT DOCUMENTS

| | | | | |
|---|---|---|---|---|
| 5,417,053 | A * | 5/1995 | Uji | F01K 21/042 60/39.58 |
| 6,141,955 | A * | 11/2000 | Akiyama | F01K 21/047 60/39.15 |
| 6,233,940 | B1 * | 5/2001 | Uji | F01K 21/047 60/39.01 |
| 6,523,346 | B1 * | 2/2003 | Hoffmann | F02C 7/18 60/646 |
| 6,644,012 | B2 * | 11/2003 | Hoffmann | F02C 7/18 60/39.182 |
| 6,672,072 | B1 | 1/2004 | Giffin, III | |
| 7,200,997 | B2 * | 4/2007 | Carlson, Jr | F01K 21/047 60/39.55 |
| 7,251,926 | B2 * | 8/2007 | Shibata | F02C 3/30 60/39.511 |
| 2011/0162386 | A1 | 7/2011 | Chandrabose et al. | |
| 2015/0010382 | A1 | 1/2015 | Subramaniyan et al. | |

OTHER PUBLICATIONS

Development of Next Generation Gas Turbine Combined Cycle System. GT2016-56322, pp. V003T08A004; 6 pages.

* cited by examiner

GAS TURBINE AND METHOD OF OPERATING THE SAME

CROSS-REFERENCE TO RELATED APPLICATIONS

This application claims priority to Korean Patent Application No. 10-2018-0026856, filed on Mar. 7, 2018, the disclosure of which is hereby incorporated by reference herein in its entirety.

FIELD

Exemplary embodiments of the present disclosure relate to a gas turbine and a method of operating the same.

BACKGROUND

The statements in this section merely provide background information related to the present disclosure and do not constitute prior art.

A gas turbine is a power engine that mixes air compressed in a compressor with fuel for combustion and rotates a turbine using high-temperature gas produced by the combustion. The gas turbine is used to drive a generator, an aircraft, a ship, a train, etc.

This gas turbine typically includes a compressor, a combustor, and a turbine. The compressor sucks and compresses outside air, and then transfers the compressed air to the combustor. The air compressed in the compressor enters into a high-pressure and high-temperature state. The combustor mixes the compressed air introduced from the compressor with fuel and burns a mixture the fuel and the compressed air. Combustion gas (i.e., the combusted mixture of the fuel and the compressed air) produced by the combustion is discharged to the turbine. Turbine blades in the turbine are rotated by the combustion gas, thereby generating power. The generated power is used in various fields, such as generating electric power and actuating machines.

Fuel is injected through a nozzle installed in each combustor, and gaseous fuel may be premixed in the nozzle to be injected therefrom. The combustion temperature of fuel must be controlled within a predetermined range in order to reduce NOx. However, the inventor(s) notes that the known combustor has difficulty to precisely control the chamber temperature of the combustor.

SUMMARY

In accordance with one aspect of the present disclosure, a gas turbine includes a compressor to compress air introduced thereinto, a combustor to mix compressed air in the compressor with fuel to make a mixture of the compressed air and the fuel, wherein the mixture is used for combustion, a main turbine having a plurality of turbine blades rotated by an energy produced by combustion gas burned in the combustor, a heat recovery boiler to produce steam by heat exchange with the combustion gas discharged from the main turbine, and a fluid accelerator supplied with a first fluid compressed in the compressor to compress the first fluid and supply the compressed first fluid to the combustor, wherein the fluid accelerator includes a first inlet through which the first fluid supplied from the compressor is introduced, a second inlet through which a second fluid having a higher pressure than the first fluid is introduced, and an outlet through which the first and second fluids are mixed and discharged.

In accordance with another aspect of the present disclosure, a method of operating a gas turbine includes compressing and discharging air, burning compressed air and fuel to produce combustion gas, supplying the compressed air and steam to a fluid accelerator to pressurize and accelerate the compressed air while mixing the steam and the compressed air with each other, and cooling a combustor by supplying the combustor with a mixture of the steam and air discharged from the fluid accelerator.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTIONS

The present disclosure is to provide a gas turbine capable of pressurizing and/or accelerating air using minimum power to supply it to a combustor, and a method of operating the same.

The present disclosure can be understood by the following description, and become apparent with reference to the exemplary embodiments of the present disclosure. Also, it is obvious to those skilled in the art to which the present disclosure pertains that the objects and advantages of the present disclosure can be realized by the means as claimed and combinations thereof.

The present disclosure may be subjected to various modifications and have various embodiments. Specific embodiments are illustrated in the drawings and will be described in the detailed description of the present disclosure. However, this is not intended to limit the present disclosure to specific embodiments. It should be understood that the present disclosure includes all modifications, equivalents or replacements that fall within the spirit and technical scope of the claimed invention, and the scope of the claimed invention is not limited to the following embodiments.

The terminology used in the present disclosure is for the purpose of describing particular embodiments only and is not intended to limit its meaning itself. As used in the disclosure and the appended claims, the singular forms "a", "an" and "the" are intended to include the plural forms as well, unless context clearly indicates otherwise. It will be further understood that the terms "comprises/includes" and/ or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Exemplary embodiments of the present disclosure will be described below in more detail with reference to the accompanying drawings. Throughout the disclosure, like reference numerals refer to like parts throughout the various figures and embodiments of the present disclosure. In certain embodiments, detailed descriptions of functions and configurations well known in the art may be omitted solely for purpose of concise descriptions to thereby avoid obscuring appreciation of the disclosure by a person of ordinary skill in the art. For the same reason as addressed above, some components may be exaggerated, omitted, or schematically illustrated in the accompanying drawings.

Hereinafter, a gas turbine according to a first embodiment of the present disclosure will be described.

Figure 1:
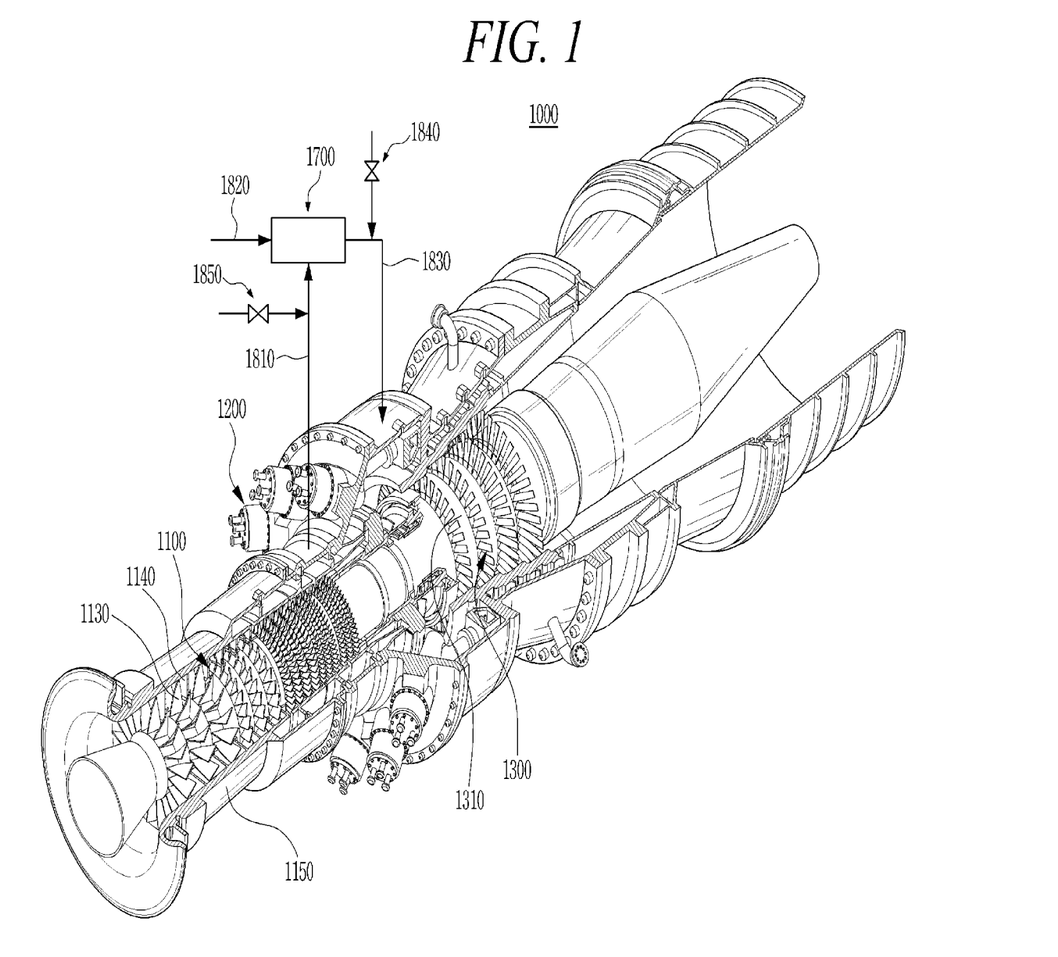
FIG. 1 is a view illustrating an interior of a gas turbine according to a first exemplary embodiment of the present disclosure.
Figure 2:
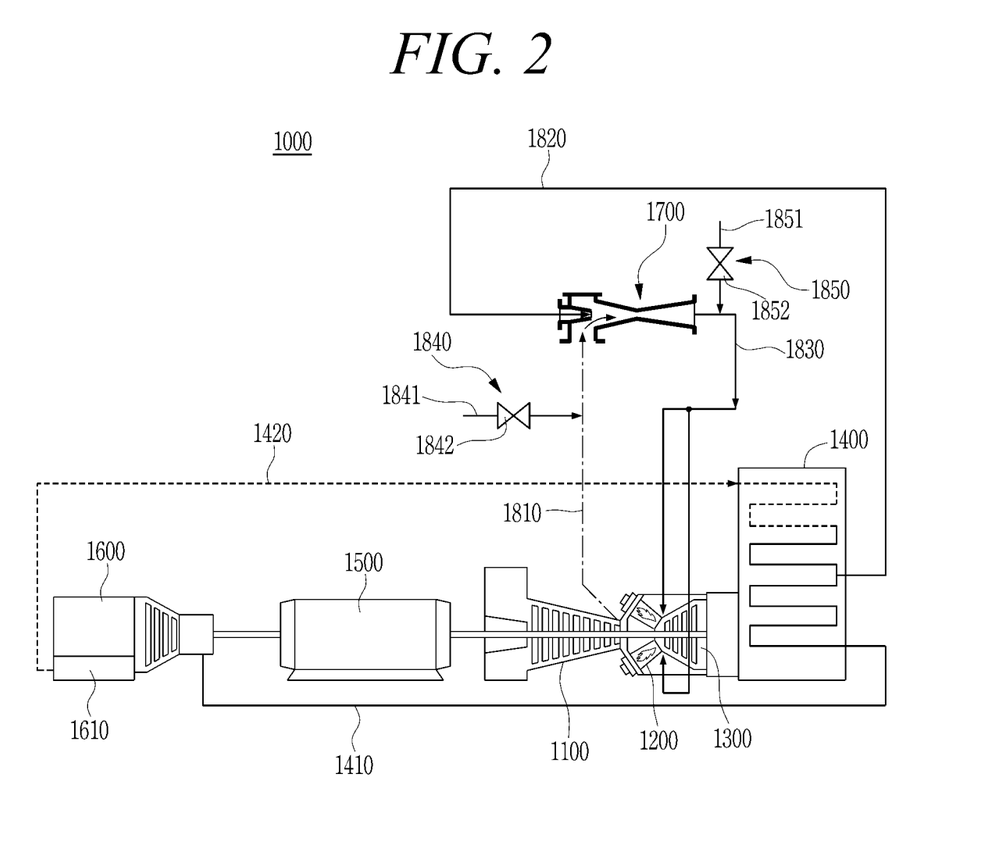
FIG. 2 is a schematic diagram illustrating the gas turbine according to the first exemplary embodiment of the present disclosure.

FIG. 1 is a view illustrating the interior of the gas turbine according to the first embodiment of the present disclosure. FIG. 2 is a schematic diagram illustrating the gas turbine according to the first embodiment of the present disclosure.

The thermodynamic cycle of the gas turbine, which is designated by reference numeral 1000, according to the present embodiment may ideally follow a Brayton cycle. The Brayton cycle consists of four phases including isentropic compression (adiabatic compression), isobaric heat addition, isentropic expansion (adiabatic expansion), and isobaric heat dissipation. In other words, in the Brayton cycle, thermal energy may be released by combustion of fuel in an isobaric environment after the atmospheric air is sucked and compressed to a high pressure, hot combustion gas may be expanded to be converted into kinetic energy, and exhaust gas with residual energy may then be discharged to the atmosphere. The Brayton cycle consists of four processes, i.e., compression, heating, expansion, and exhaust.

The gas turbine 1000 using the above Brayton cycle may include a compressor 1100, a combustor 1200, a main turbine 1300, a heat recovery boiler 1400, a generator 1500, a steam turbine 1600, and a fluid accelerator 1700, as illustrated in FIGS. 1 and 2. Although the following description is given with reference to FIG. 1, the present disclosure may be widely applied to a gas turbine having the same configuration as the gas turbine 1000 exemplarily illustrated in FIG. 1.

Referring to FIG. 1, the compressor 1100 of the gas turbine 1000 may suck and compress air from the outside. The compressor 1100 may supply the air compressed by compressor blades 1130 to the combustor 1200 and may supply cooling air to a high-temperature region required for cooling in the gas turbine 1000. In this case, since the air sucked into the compressor 1100 is subject to an adiabatic compression process therein, the pressure and temperature of the air having passed through the compressor 1100 increase.

The compressor 1100 is designed as a centrifugal compressor or an axial compressor. In general, the centrifugal compressor is applied to a small gas turbine, whereas the multistage axial compressor 1100 is applied to the large gas turbine 1000 as illustrated in FIG. 1 because it is necessary to compress a large amount of air. In the multistage axial compressor 1100, the blades 1130 of the compressor 1100 rotate along with the rotation of a rotor disk to compress air introduced thereinto while moving the compressed air to rear-stage compressor vanes 1140. The air is increasingly compressed to a high pressure while passing through the compressor blades 1130 formed in a multistage manner.

A plurality of compressor vanes 1140 may be formed in a multistage manner and be mounted in a housing 1150. The compressor vanes 1140 guide the compressed air moved from front-stage compressor blades 1130 to rear-stage compressor blades 1130. In the present embodiment, at least some of the multistage compressor vanes 1140 may be mounted so as to be rotatable within a fixed range for regulating the inflow rate of air or the like.

The compressor 1100 may be actuated by some of the power output from the main turbine 1300. To this end, the rotary shaft of the compressor 1100 may be directly connected to the rotary shaft of the main turbine 1300 as illustrated in FIG. 1. In the large gas turbine 1000, the compressor 1100 may require about half of the power generated in the main turbine 1300 to be actuated. Accordingly, improving the efficiency of the compressor 1100 has a direct influence on an improvement in overall efficiency of the gas turbine 1000. The air compressed in the compressor 1100 is introduced into a differential chamber 1180 where a duct assembly 1280 of the combustor 1200 is positioned.

Figure 3:
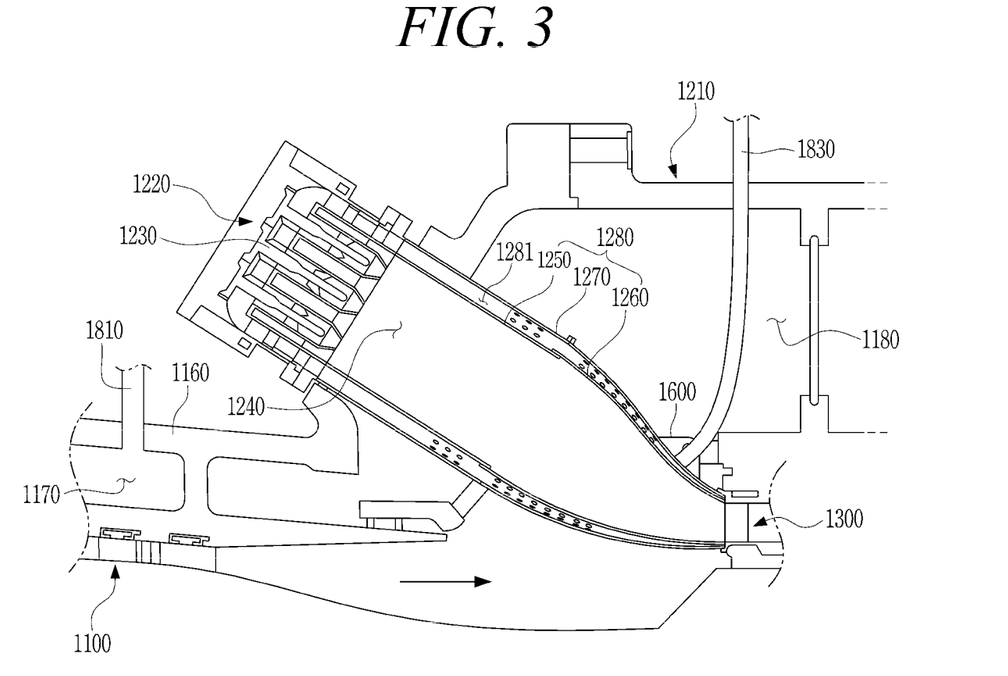
FIG. 3 is a view illustrating the combustor of FIG. 1.

The combustor 1200 may mix the compressed air, which is supplied from the outlet of the compressor 1100, with fuel for isobaric combustion to produce high-energy combustion gas. FIG. 3 illustrates an example of the combustor 1200 included in the gas turbine 1000. The combustor 1200 may include a combustor casing 1210, a burner 1220, a nozzle 1230, and a duct assembly 1280. The gas turbine 1000 may include a plurality of combustors 1200 arranged around the axis thereof.

The combustor casing 1210 may surround a plurality of burners 1220 and have a substantially circular shape. The burners 1220 may be disposed downstream of the compressor 1100 and arranged along the annular combustor casing 1210. Each of the burners 1220 has a plurality of nozzles 1230 and the fuel injected from the nozzles 1230 is mixed with air at an appropriate rate to be suitable for combustion.

The gas turbine 1000 may use gas fuel, liquid fuel, or composite fuel combining them. It is important to make a combustion environment for reducing an amount of emission such as carbon monoxide or nitrogen oxide that is subject to legal regulations. Accordingly, pre-mixed combustion has been increasingly used in recent years in that it can accomplish uniform combustion to reduce emission by lowering a combustion temperature even though it is relatively difficult to control combustion.

In the pre-mixed combustion, compressed air is mixed with the fuel pre-injected from the nozzles 1230 and then introduced into a combustion chamber 1240. When combustion is stable after pre-mixed gas is initially ignited by an igniter, the combustion is maintained by the supply of fuel and air.

Referring to FIG. 3, compressed air flows along the outer surface of the duct assembly 1280, which connects the burner 1220 to the turbine 1300 so that hot combustion gas flows through the duct assembly, and is supplied to the nozzles 1230. In this process, the duct assembly 1280 heated by the hot combustion gas is properly cooled.

The duct assembly 1280 may include a liner 1250, a transition piece 1260, and a flow sleeve 1270. The duct assembly 1280 may have a double structure in which the flow sleeve 1270 surrounds the liner 1250 and the transition piece 1260, and the flow sleeve 1270 has an annular cooling passage 1281 defined therein for flow of cooling air. The liner 1250 and the transition piece 1260 are cooled by the compressed air permeated into the cooling passage 1281 inside the flow sleeve 1270.

The air discharged from the compressor 1100 may be introduced into the differential chamber 1180 into which the duct assembly 1280 is inserted. The air introduced into the differential chamber 1180 may be introduced into the cooling passage 1281 through holes formed on the outer surface of the flow sleeve 1270 to cool the liner 1250 and the transition piece 1260.

The liner 1250 is a tubular member connected to the burner 1220 of the combustor 1200 and forms the combustion chamber 1240 defined as a space therein. The burner 1220 is coupled to one longitudinal end of the liner 1250 and the transition piece 1260 is coupled to the other longitudinal end of the liner 1250.

The transition piece 1260 is connected to the inlet of the turbine 1300 and serves to guide high-temperature combustion gas to the turbine 1300. The liner 1250 is coupled to one longitudinal end of the transition piece 1260 and the turbine 1300 is coupled to the other longitudinal end of the transition piece 1260. The flow sleeve 1270 serves to protect the liner 1250 and the transition piece 1260 and to prevent the direct release of hot air to the outside.

The high-temperature and high-pressure combustion gas produced in the combustor 1200 is supplied to the main turbine 1300 through the duct assembly 1280. In the main turbine 1300, the thermal energy of combustion gas is converted into mechanical energy to rotate the rotary shaft of the turbine by applying impingement and reaction force to a plurality of blades 1310 radially arranged on the rotary shaft of the turbine 1300 through the adiabatic expansion of the combustion gas. Some of the mechanical energy obtained from the main turbine 1300 is supplied as energy required for compression of air in the compressor 1100, and the remainder is used as effective energy required for driving the generator 1500 to produce electric power or the like.

After the combustion gas discharged from the main turbine 1300 is cooled by the heat recovery boiler 1400, it is purified and discharged to the outside. The heat recovery boiler 1400 not only cools the combustion gas but also produces high-temperature and high-pressure steam using the heat of the combustion gas to deliver it to the steam turbine 1600. The steam produced in the heat recovery boiler 1400 is delivered to the steam turbine 1600 through a first steam line 1410, and the steam cooled in the steam turbine 1600 is delivered to the heat recovery boiler 1400 through a second steam line 1420.

The steam turbine 1600 transfers rotational energy to the generator 1500 while the blades of the steam turbine 1600 are rotated by the steam produced in the heat recovery boiler 1400. The steam turbine 1600 includes a steam container 1610 storing cooled steam therein, and supplies the cooled steam back to the heat recovery boiler 1400.

Although the main turbine 1300 and the steam turbine 1600 are illustrated as being connected to the single generator 1500 in the first embodiment, the present disclosure is not limited thereto. The steam turbine 1600 and the main turbine 1300 may be connected to different generators, respectively.

The fluid accelerator 1700 is connected to the compressor 1100, the combustor 1200, and the heat recovery boiler 1400. The fluid accelerator 1700 is supplied with compressed air from the compressor 1100 and supplied with steam from the heat recovery boiler 1400 to pressurize and accelerate the compressed air and supplies it to the combustor 1200.

Figure 4:
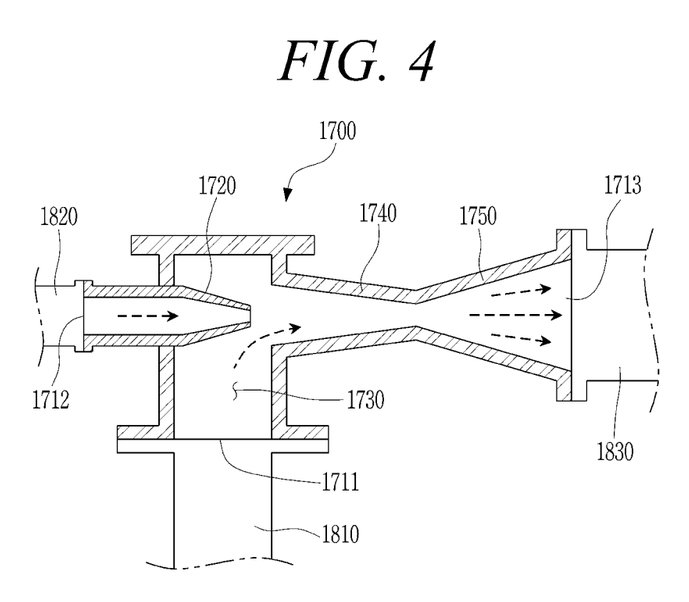
FIG. 4 is a cross-sectional view illustrating a fluid accelerator according to the first exemplary embodiment of the present disclosure.

FIG. 4 is a cross-sectional view illustrating the fluid accelerator according to the first embodiment of the present disclosure.

Referring to FIGS. 2 and 4, the fluid accelerator 1700 includes a first inlet 1711 through which a first fluid supplied from the compressor 1100 is introduced, a second inlet 1712 through which a second fluid having a higher pressure than the first fluid is introduced, and an outlet 1713 through which the first and second fluids are mixed and discharged.

The second inlet 1712 and the outlet 1713 may be disposed to face each other, and the first inlet 1711 may be formed at the side of the fluid accelerator 1700. The fluid accelerator 1700 according to the first embodiment may be an ejector that does not use power.

The second fluid may be a fluid having a higher pressure and a lower temperature than the first fluid. In addition, the second fluid may be a fluid having a higher humidity than the first fluid. Here, the first fluid may be compressed air and the second fluid may be steam.

The pressure of the second fluid may be 1.5 to 2.5 times that of the first fluid and the temperature of the second fluid may be 0.4 to 0.75 times that of the first fluid. In more detail, the first fluid as compressed air may have a temperature of 400 to 550° C. and a pressure of 20 to 26 bar. The second fluid as steam may have a pressure of 40 to 50 bar and a temperature of 200 to 300° C. Here, the conditions of the first fluid are based on when the first fluid is discharged from the compressor.

The pressure and temperature of steam increase as the steam is heated in the heat recovery boiler 1400. Therefore, the steam is extracted at a point where the temperature of the steam is lower than that of the compressed air and the pressure of the steam is higher than that of the compressed air, so as to supply the steam to the fluid accelerator 1700.

The fluid accelerator 1700 may include a jet nozzle 1720, a suction chamber 1730, a mixing section 1740, and a diffuser 1750. The jet nozzle 1720 is connected to the second inlet 1712 and is inserted into the suction chamber 1730. The jet nozzle 1720 may be formed such that its inner diameter decreases toward the tip thereof, and the jet nozzle 1720 injects steam into the suction chamber 1730. However, the jet nozzle 1720 may also be formed such that its inner diameter decreases and then increases.

The suction chamber 1730 is connected to the first inlet 1711 and has an internal space. When high-pressure steam is injected into the suction chamber 1730, compressed air is pressurized and drawn into the suction chamber 1730 by the negative pressure generated in the suction chamber 1730. The mixing section 1740 may have a tubular shape connected to the suction chamber 1730 and may be formed such that its inner diameter decreases toward the tip thereof. Thus, the steam and the compressed air are mixed in the mixing section and the velocity of the fluid increases therein. The diffuser 1750 is connected to the mixing section 1740 and the outlet 1713 and is formed such that its inner diameter increases toward the tip thereof. The diffuser 1750 decelerates the mixed fluid and increases the pressure of the fluid to discharge the fluid.

The gas turbine 1000 may further include a first connection line 1810 connecting the fluid accelerator 1700 to the compressor 1100, a second connection line 1820 connecting the heat recovery boiler 1400 to the fluid accelerator 1700, and a discharge line 1830 connecting the combustor 1200 to the fluid accelerator 1700.

The first connection line 1810 connects a bleeding cavity 1170 formed inside the casing 1160 of the compressor 1100 to the first inlet 1711 of the fluid accelerator 1700. The bleeding cavity 1170 is connected to the inside of the compressor to store compressed air therein.

The second connection line 1820 connects the heat recovery boiler 1400 to the second inlet 1712 of the fluid accelerator 1700. The second connection line 1820 is connected to the heat recovery boiler 1400 at a point where it has a higher pressure and a lower temperature than the compressed air. The steam flowing in the heat recovery boiler 1400 may have a three-stage pressure, and the second connection line 1820 may be connected to a portion where the steam with intermediate pressure is positioned.

The discharge line 1830 connects the outlet 1713 of the fluid accelerator 1700 to the cooling passage 1281 defined in the duct assembly 1280. The discharge line 1830 extends into the differential chamber 1180 and is connected to the flow sleeve 1270.

A first refrigerant supply unit 1840 for supplying a cooling medium to the compressed air may be installed to the first connection line 1810, and a second refrigerant supply unit 1850 for supplying a cooling medium to the mixed fluid may be installed to the discharge line 1830. Here, the cooling medium as refrigerant may be a liquid, and more specifically, water ($H_2O$).

The first refrigerant supply unit 1840 may include a first refrigerant line 1841 connected to the first connection line 1810, and a first refrigerant valve 1842 installed to the first refrigerant line 1841 to control the supply of refrigerant. The first refrigerant supply unit 1840 may supply water to the first connection line 1810, and the water injected into the first connection line 1810 cools compressed air while vaporizing.

The first refrigerant supply unit 1840 may further include a nozzle for injection of water. When the water as liquid is sprayed from the nozzle, the compressed air can be efficiently cooled by latent heat of vaporization. The cooling by the latent heat of vaporization exhibits significantly better cooling efficiency than that by a conventional heat exchanger. The water flowing to the first refrigerant line 1841 has a higher pressure than the compressed air, namely a pressure of 1.1 to 1.3 times higher than the compressed air. In detail, the pressure of the water may be 26 to 27 bar.

The second refrigerant supply unit 1850 may include a second refrigerant line 1851 connected to the discharge line 1830, and a second refrigerant valve 1852 installed to the second refrigerant line 1851 to control the supply of refrigerant. The second refrigerant supply unit 1850 may spray water to the second connection line 1820, and the water sprayed to the second connection line 1820 cools compressed air while vaporizing. The water flowing to the second refrigerant line 1851 has a higher pressure than the compressed air, namely a pressure of 1.1 to 1.3 times higher than the compressed air. The mixed air, which is cooled by the second refrigerant supply unit 1850 and introduced into the combustor 1200, may have a temperature of 200° C. or less and a pressure of 25 to 30 bar.

The flow rate of the first refrigerant supplied through the first refrigerant line 1841 is larger than that of the second refrigerant supplied through the second refrigerant line 1851. The flow rate of the first refrigerant may be 1.8 to 2.2 times that of the second refrigerant.

Since the mixed air discharged from the fluid accelerator 1700 has a relatively high humidity, it is advantageous to cool the air while injecting and vaporizing a relatively small amount of water.

In accordance with the first embodiment, the first and second refrigerant supply units 1840 and 1850 are provided to primarily cool the compressed air before it is mixed with the steam and to secondarily cool the compressed air mixed with the steam. Accordingly, it is possible to further improve the cooling efficiency of the compressed air by cooling the compressed air in a multistage manner. In addition, the entire system of the gas turbine can minimize the loss of heat since air is not cooled while the heat is released but is cooled while the flow rate of refrigerant is increased by the addition of fluid. Furthermore, since steam is added as a working fluid, the overall efficiency of the gas turbine 1000 can be improved by about 3%.

The air bled from the compressor 1100 may be supplied to the cooling passage 1281 of the combustor 1200 after it is pressurized, cooled, and humidified. The mixed fluid discharged from the single fluid accelerator 1700 may be supplied to a plurality of combustors 1200. However, the present disclosure is not limited thereto, and one fluid accelerator 1700 may also be connected to each combustor 1200 so that the mixed fluid discharged from that fluid accelerator 1700 is supplied to the associated combustor 1200.

The compressed air discharged from the fluid accelerator 1700 contains a larger amount of moisture than the compressed air discharged from the compressor 1100. Thus, since the specific heat of refrigerant increases, it is possible to cool the combustor 1200 with more efficiency.

The combustor 1200 may be cooled while the compressed air discharged from the fluid accelerator 1700 flows along the cooling passage 1281 together with the compressor air which is discharged from the compressor 1100 and introduced into the differential chamber 1180. The air used to cool the duct assembly 1280 may cool the nozzles 1230 and then be introduced into the combustion chamber 1240 as in the related art.

In accordance with the first embodiment, the compressed air may be pressurized, cooled, humidified, and supplied to the combustor 1200 by the fluid accelerator 1700 without using any power. In addition, when the temperature of the combustor 1200 is controlled within a predetermined range by the humidified and cooled compressed air, the generation of nitrogen oxides can be reduced.

Since the steam is extracted from the heat recovery boiler 1400, it is possible to reduce the size and pressure of the steam container 1610 storing the cooled steam therein. It is not easy to store the steam produced in the cooling process of the heat recovery boiler 1400 because the steam has a very large volume and a very high pressure. Thus, a very large and robust pressure vessel is required for storage of steam. However, when some steam is discharged from the heat recovery boiler 1400 as in the first embodiment, it is possible to reduce the volume of the steam container 1610 as well as the pressure of the steam.

Figure 5:
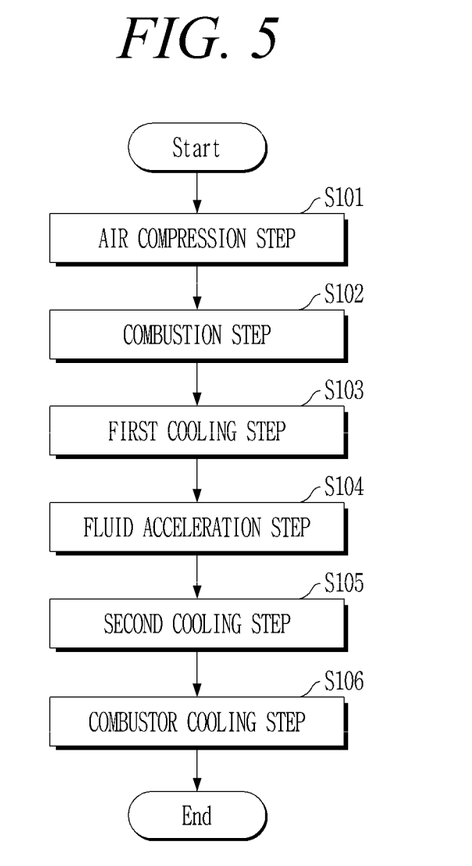
FIG. 5 is a flowchart for explaining a method of operating the gas turbine according to the first exemplary embodiment of the present disclosure.

Hereinafter, a method of operating the gas turbine according to the first embodiment of the present disclosure will be described. FIG. 5 is a flowchart for explaining the method of operating the gas turbine according to the first embodiment of the present disclosure.

Referring to FIGS. 2 to 5, the method of operating the gas turbine 1000 according to the first embodiment may include an air compression step S101, a combustion step S102, a first cooling step S103, a fluid acceleration step S104, a second cooling step S105, and a combustor cooling step S106, for the efficient cooling of the combustor 1200.

The air compression step S101 compresses and discharge air using the compressor 1100. The combustion step S102 mixes the air supplied from the compressor 1100 with fuel for combustion to produce combustion gas.

The first cooling step S103 bleeds and cools the air compressed in the compressor 1100. The first cooling step S103 cools the compressed air by injecting water into the first connection line 1810 in which the compressed air flows. The first cooling step S103 may cool the high-temperature compressed air using the latent heat of vaporization of water obtained by injecting the water into the compressed air and vaporizing the water. In the first cooling step S103, the water is injected at a higher pressure than the compressed air and the water has a pressure of 1.1 to 1.3 times higher than the compressed air.

The fluid acceleration step S104 pressurizes and accelerates the compressed air using the fluid accelerator 1700 as the ejector. The fluid acceleration step S104 supplies the compressed air cooled in the first cooling step S103 to the fluid accelerator 1700, and supplies the steam heated in the heat recovery boiler 1400 to the fluid accelerator 1700. The fluid acceleration step S104 extracts steam having a higher pressure and a lower temperature than air from the heat recovery boiler 1400 and supplies it to the fluid accelerator 1700.

The second cooling step S105 cools a mixture of the steam and air pressurized and discharged in the fluid accelerator step S104 by injection water into the discharge line 1830 in which the mixture flows. The second cooling step S105 may cool the mixture using the latent heat of vaporization of water obtained by injecting the water into the second connection line 1820 and vaporizing the water.

In the second cooling step S105, the water is injected at a higher pressure than the compressed air and the water has a pressure of 1.1 to 1.3 times higher than the compressed air. The flow rate of the water injected in the second cooling step S105 is smaller than that of the water injected in the first cooling step S103. The flow rate of the water injected in the first cooling step S103 may be 1.8 to 2.2 times that of the water injected in the second cooling step S105.

The combustor cooling step S106 cools the combustor 1200 by supplying the combustor 1200 with the mixture of the steam and air discharged in the fluid acceleration step S104 and then cooled in the second cooling step. The combustor cooling step S106 cools the liner 1250 and the transition piece 1260 by supplying the mixture to the cooling passage 1281 defined in the duct assembly 1280 of the combustor 1200.

In accordance with the method of operating the gas turbine according to the first embodiment, it is possible to efficiently control the temperature of the combustor 1200 by pressurizing and accelerating the bled compressed air using high-pressure steam and cooling the combustor 1200 and to reduce nitrogen oxides by lowering the temperature of the combustor 1200.

Hereinafter, a gas turbine according to a second embodiment of the present disclosure will be described.

Figure 6:
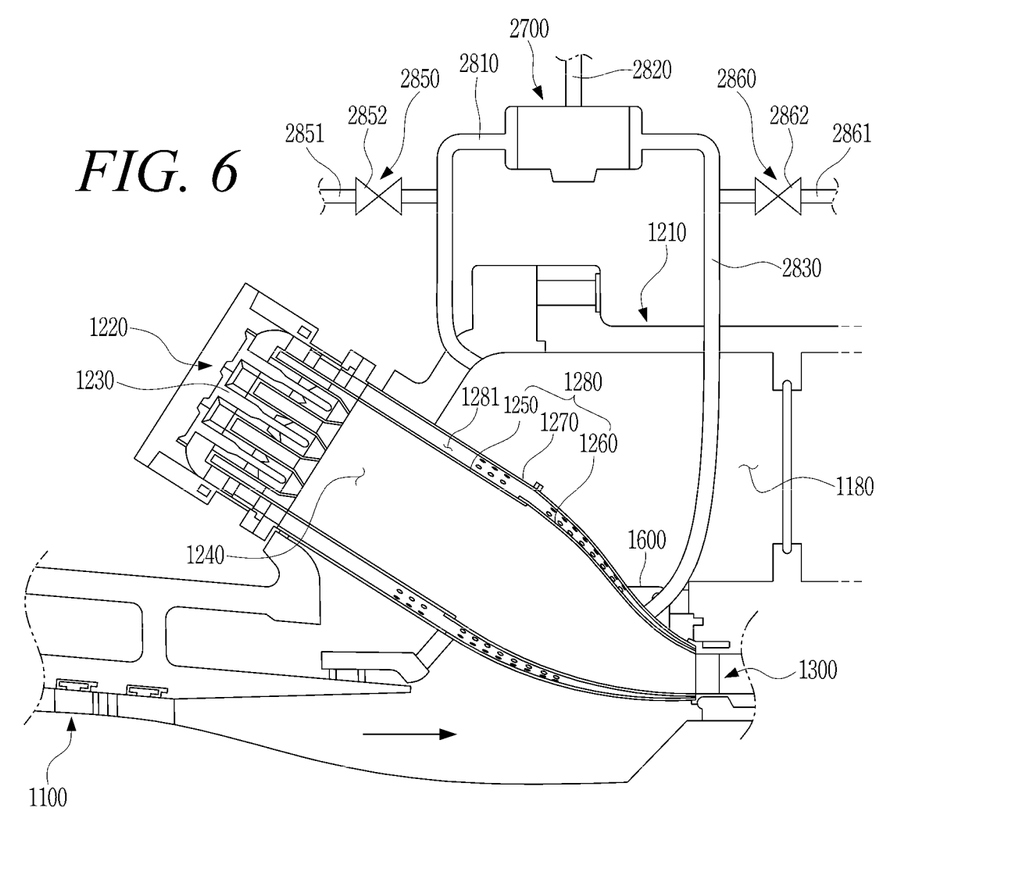
FIG. 6 is a view illustrating a combustor according to a second exemplary embodiment of the present disclosure.
Figure 7:
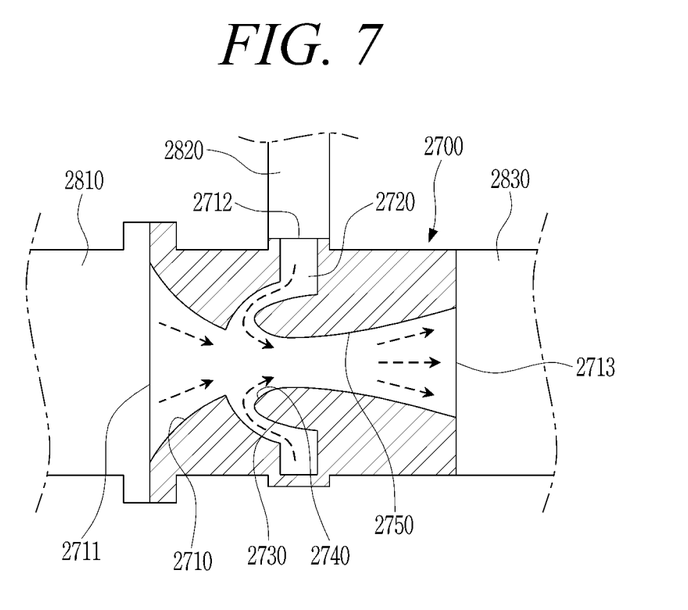
FIG. 7 is a cross-sectional view illustrating a fluid accelerator according to the second exemplary embodiment of the present disclosure.

FIG. 6 is a view illustrating a combustor according to the second embodiment of the present disclosure. FIG. 7 is a cross-sectional view illustrating a fluid accelerator according to the second embodiment of the present disclosure.

Referring to FIGS. 6 and 7, since the gas turbine according to the second embodiment has the same structure as the gas turbine according to the first embodiment except for a fluid accelerator 2700 and lines connected thereto, a duplicate description thereof will be omitted.

The fluid accelerator 2700 of the second embodiment includes a first inlet 2711 through which a first fluid is introduced, a second inlet 2712 through which a second fluid having a higher pressure than the first fluid is introduced, and an outlet 2713 through which the first and second fluids are mixed and discharged. The first inlet 2711 and the outlet 2713 are disposed to face each other, and the second inlet 2712 is formed at the side of the fluid accelerator 2700.

The fluid accelerator 2700 of the second embodiment compresses a fluid without power using the Coanda effect. Here, the first fluid may be compressed air, and the second fluid may be steam.

The fluid accelerator 2700 has a substantially tubular shape, and includes an inflow guide 2710, a distribution passage 2720, an induction passage 2730, a guide curved surface 2740, and a diffuser 2750. The inflow guide 2710 is connected to the first inlet 2711 and is formed such that its inner diameter gradually decreases in the flow direction of air and its inner peripheral surface gradually protrudes toward the axial center thereof. Accordingly, the velocity of the compressed air passing through the inflow guide 2710 increases whereas the pressure thereof decreases.

The distribution passage 2720 is connected to the second inlet 2712 and extends in an annular form along the circumference of the fluid accelerator 2700. The distribution passage 2720 is connected to a plurality of induction passages 2730 and each of the induction passage 2730 is connected to the inside of the fluid accelerator between the inflow guide 2710 and the diffuser 2750.

Accordingly, the steam introduced through the second inlet 2712 flows in the circumferential direction of the fluid accelerator 2700 along the distribution passage 2720, in which process the steam is injected into the fluid accelerator 2700 through the induction passage 2730. It is possible to uniformly inject high-pressure steam into the fluid accelerator 2700 by forming the distribution passage 2720 and the induction passage 2730.

The guide curved surface 2740 connects the induction passage 2730 to the diffuser 2750 to induce the flow of steam. The steam injected from the induction passage 2730 may be injected into the diffuser 2750 along the guide curved surface 2740 by the Coanda effect. The inflow of compressed air may be accelerated by the negative pressure formed in the fluid accelerator 2700 by the steam injected from the induction passage 2730.

The steam flow along the guide curved surface 2740 by the Coanda effect, and the negative pressure is formed behind the steam flowing at a high speed so that the compressed air is accelerated and flows to the diffuser 2750.

The diffuser 2750 is connected to the inflow guide 2710 and the outlet 2713 and is formed such that its inner diameter gradually increases in the flow direction of air. Accordingly, the velocity of the fluid passing through the diffuser 2750 decreases whereas the pressure thereof increases. The compressed air accelerated by the steam is mixed with the steam while passing through the diffuser 2750 and is further compressed and discharged.

The gas turbine may further include a first connection line 2810 for supplying the compressed air to the fluid accelerator 2700, a second connection line 2820 connecting the heat recovery boiler to the fluid accelerator 2700, and a discharge line 2830 connecting the combustor 1200 to the fluid accelerator 2700.

The first connection line 2810 connects the differential chamber 1180, through which the air discharged from the compressor passes, to the first inlet 2711 of the fluid accelerator 2700. The differential chamber 1180 a space through which the air discharged from the compressor passes before being introduced each combustor 1200. In the present embodiment, air is not directly bled from the compressor, but the air discharged from the compressor is bled from the differential chamber 1180 and is supplied to the fluid accelerator 2700.

The second connection line 2820 connects the heat recovery boiler to the second inlet 2712 of the fluid accelerator 2700. The discharge line 2830 connects the outlet 2713 of the fluid accelerator 2700 to the cooling passage 1281 defined in the duct assembly 1280.

A first refrigerant supply unit 2840 for supplying a cooling medium to the compressed air may be installed to the first connection line 2810, and a second refrigerant supply unit 2850 for supplying a cooling medium to the mixed fluid may be installed to the discharge line 2830.

The first refrigerant supply unit 2840 may include a first refrigerant line 2841 connected to the first connection line 2810, and a first refrigerant valve 2842 installed to the first refrigerant line 2841 to control the injection of water. The second refrigerant supply unit 2850 may include a second refrigerant line 2851 connected to the discharge line 2830, and a second refrigerant valve 2852 installed to the second refrigerant line 2851 to control the injection of water. Each of the first and second refrigerant supply unit 2840 and 2850 may further include a nozzle for injection of water.

Figure 8:
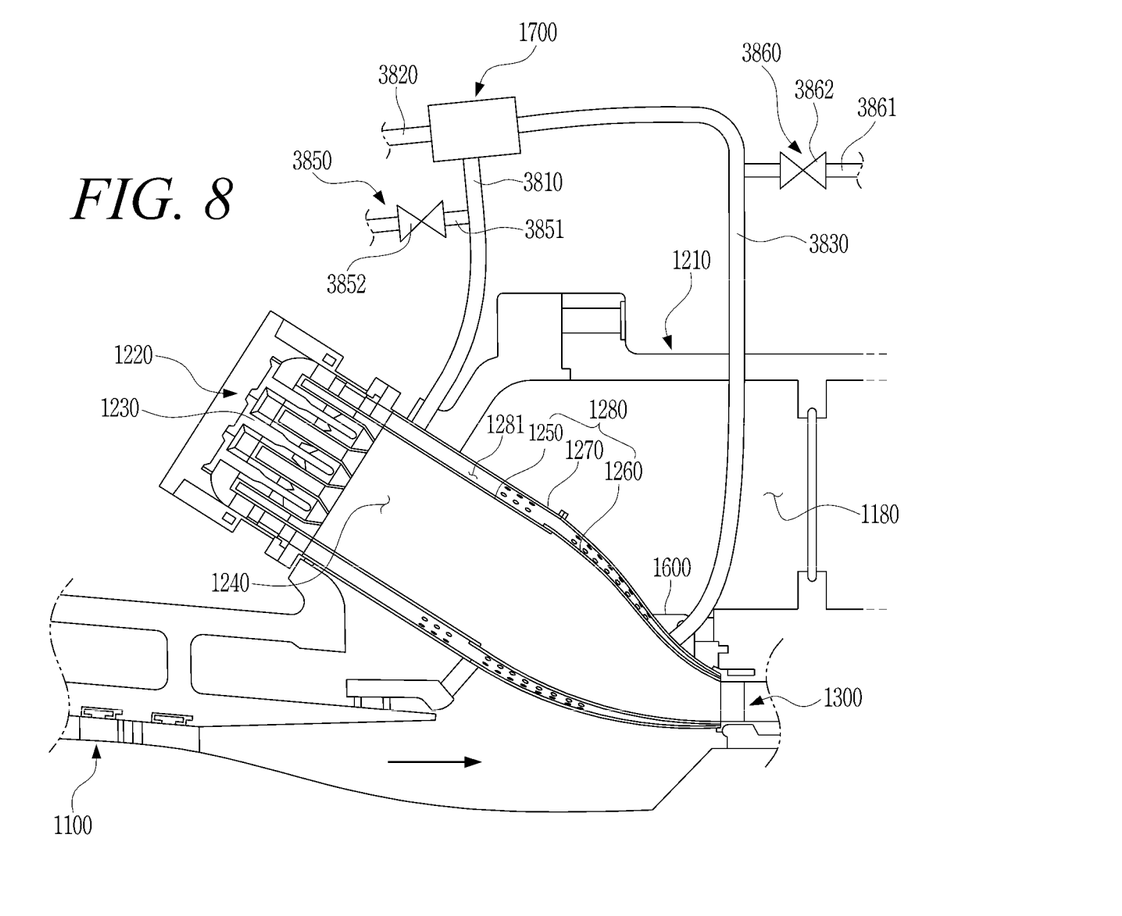
FIG. 8 is a view illustrating a combustor according to a third exemplary embodiment of the present disclosure.

Hereinafter, a gas turbine according to a third embodiment of the present disclosure will be described. FIG. 8 is a view illustrating a combustor according to the third embodiment of the present disclosure.

Referring to FIG. 8, since the gas turbine according to the third embodiment has the same structure as the gas turbine according to the first embodiment except for lines connected to the fluid accelerator 1700, a duplicate description thereof will be omitted.

The gas turbine may further include a first connection line 3810 for supplying the compressed air to the fluid accelerator 1700, a second connection line 3820 connecting the heat recovery boiler to the fluid accelerator 1700, and a discharge line 3830 connecting the combustor 1200 to the fluid accelerator 1700.

The first connection line 3810 connects the cooling passage 1281 defined in the duct assembly 1280 to the first inlet 1711 of the fluid accelerator 1700. The air discharged from the compressor is introduced into the cooling passage 1281 through the differential chamber, and cools the duct assembly 1280 while passing through the cooling passage 1281. The compressed air used to cool the duct assembly 1280 is delivered to the fluid accelerator 1700 through the first connection line 3810. To this end, the first connection line 3810 may be connected downstream of the cooling passage 1281 before the compressed air is introduced into the nozzle. The "downstream" herein means that it is positioned further forward from the longitudinal center of the cooling passage in the flow direction of air.

The second connection line 3820 connects the heat recovery boiler to the second inlet 1712 of the fluid accelerator 1700. The discharge line 3830 connects the outlet 1713 of the fluid accelerator 1700 to the cooling passage 1281 defined in the duct assembly 1280.

The discharge line 3830 may be connected upstream of the cooling passage 1281, namely to the cooling passage at a point where the compressed air in the differential chamber begins to be introduced into the cooling passage. The discharge line 3830 may be positioned further upstream from the first connection line 3810 in the flow direction of the air flowing along the cooling passage 1281. The "upstream" herein means that it is positioned further rearward from the longitudinal center of the cooling passage in the flow direction of air.

In accordance with the third embodiment, the compressed air for cooling the duct assembly 1280 is supplied to the fluid accelerator 1700, and the air compressed and cooled while passing through the fluid accelerator 1700 is supplied back to the duct assembly 1280. Therefore, it is possible to more smoothly perform the flow of air in the cooling passage 1281 and to cool the combustor 1200 with more efficiency by increasing the flow rate of air.

A first refrigerant supply unit 3840 for supplying a cooling medium to the compressed air may be installed to the first connection line 3810, and a second refrigerant supply unit 3850 for supplying a cooling medium to the mixed fluid may be installed to the discharge line 3830.

The first refrigerant supply unit 3840 may include a first refrigerant line 3841 connected to the first connection line 3810, and a first refrigerant valve 3842 installed to the first refrigerant line 3841 to control the injection of water. The second refrigerant supply unit 3850 may include a second refrigerant line 3851 connected to the discharge line 3830, and a second refrigerant valve 3852 installed to the second refrigerant line 3851 to control the injection of water. Each of the first and second refrigerant supply unit 3840 and 3850 may further include a nozzle for injection of water.

As is apparent from the above description, since the gas turbine according to one embodiment of the present disclosure pressurizes compressed air using the fluid accelerator and supplies it to the combustor, exemplary embodiments of the present application obtain advantageous effects to more efficiently cool the combustor and to pressurize and accelerate the compressed air without using power.

In the method of operating the gas turbine according to another embodiment of the present disclosure, exemplary embodiments of the present application obtain advantageous effects to efficiently control the temperature of the combustor by pressurizing and accelerating the bled compressed air using high-pressure steam and cooling the combustor and to reduce nitrogen oxides by lowering the temperature of the combustor.

It can be said that the present disclosure may provide a gas turbine comprising: a compressor configured to compress air introduced thereinto; a combustor configured to mix the compressed air with fuel to make a mixture of the compressed air and the fuel, wherein the mixture is used for combustion; a main turbine having a plurality of turbine blades rotated by an energy produced by combustion gas burned in the combustor; a heat recovery boiler configured to produce steam by heat exchange with the combustion gas discharged from the main turbine; and a fluid accelerator supplied with a first fluid compressed in the compressor to compress the first fluid and supply the compressed first fluid to the combustor, wherein the fluid accelerator comprises a first inlet through which the first fluid supplied from the compressor is introduced, a second inlet through which a second fluid having a higher pressure than the first fluid is introduced, and an outlet through which the first and second fluids are mixed and discharged.

The first inlet may be connected to a first connection line through which the first fluid is delivered to the fluid accelerator, and a first refrigerant supply unit may be installed to the first connection line to inject a refrigerant for cooling the first fluid into the first connection line.

The outlet may be connected to a discharge line through which the mixed fluid is delivered to the combustor, a second refrigerant supply unit may be installed to the discharge line to inject a refrigerant into the discharge line, and a flow rate of the refrigerant injected by the first refrigerant supply unit is larger than that of the refrigerant injected by the second refrigerant supply unit.

The combustor comprises a duct assembly in which the combustion gas flows, the duct assembly has a double-tube structure to define a cooling passage therein, and the gas turbine further comprises a discharge line connecting the cooling passage to the outlet. And, the second fluid has a lower temperature and a higher pressure than the first fluid. Here, the pressure of the second fluid may be 1.5 to 2.5 times that of the first fluid, and the temperature of the second fluid may be 0.4 to 0.75 times that of the first fluid.

The gas turbine of present disclosure may further comprising: a first connection line connecting the compressor to the fluid accelerator, a differential chamber accommodating the air discharged from the compressor therein, a first connection line connecting the differential chamber to the fluid accelerator, a second connection line connecting the heat recovery boiler to the fluid accelerator to supply the steam from the heat recovery boiler to the fluid accelerator. Also, the combustor comprises a duct assembly in which the combustion gas flows, the duct assembly having a double-tube structure to define a cooling passage therein; and the gas turbine further comprises a first connection line connecting the downstream side of the cooling passage to the fluid accelerator to supply the compressed air to the fluid accelerator, and a discharge line connecting the upstream side of the cooling passage to the outlet. And, the fluid accelerator may comprise a jet nozzle into which the second fluid is introduced, a suction chamber into which the first fluid is introduced, a mixing section in which the first and second fluids are mixed with each other, and a diffuser from which the mixed fluid is discharged. the fluid accelerator may further comprise an inflow guide into which the first fluid is introduced, the inflow guide being formed such that its inner diameter decreases in a flow direction of air, a distribution passage into which the second fluid is introduced, the distribution passage extending in an annular form, a plurality of induction passages connected to the distribution passage and the inflow guide, and a diffuser from which the mixed first and second fluids are discharged. Here, a guide curved surface is formed between the induction passages and the diffuser to induce a flow of the second fluid.

Also, it can be said that the present disclosure provides a method of operating a gas turbine, comprising: compressing and discharging air; burning compressed air and fuel to produce combustion gas; supplying the compressed air and steam to a fluid accelerator to pressurize and accelerate the compressed air while mixing the steam and the compressed air with each other; and cooling a combustor by supplying the combustor with a mixture of the steam and air discharged from the fluid accelerator.

Here, the supplying compressed air and steam to a fluid accelerator may supply the steam heated by the combustion gas in a heat recovery boiler to the fluid accelerator. And, the supplying compressed air and steam to a fluid accelerator may supply the steam having a higher pressure and a lower temperature than the air to the fluid accelerator.

The present disclosure may provide the method of operating a gas turbine, further comprising: bleeding and cooling compressed air by injecting water into a first connection line through which the compressed air flows, the bleeding and cooling compressed air being performed after the compressing and discharging air; cooling the mixture of the steam and air pressurized and discharged in the supplying compressed air and steam to a fluid accelerator by injecting water into a discharge line through which the mixture flows. Here, the cooling a combustor may cool the combustor by supplying the mixture to a cooling passage defined in a duct assembly. And, the supplying compressed air and steam to a fluid accelerator pressurizes and accelerates the compressed air using the fluid accelerator as an ejector.

Although the present disclosure has been described with respect to the various embodiments as exemplarily described above, it will be apparent to those skilled in the art that various variations and modifications of the present disclosure and the claimed invention may be directly or indirectly motivated and embodied by adding, changing, or removing components without departing from the spirit and scope of the claimed invention as defined in the following claims, and these variations and modifications fall within the spirit and scope of the claimed invention as defined in the appended claims.

What is claimed is:

1. A gas turbine comprising:
   a compressor configured to compress air introduced thereinto;
   a combustor configured to mix the compressed air with fuel to make a mixture of the compressed air and the fuel, wherein the mixture is used for combustion;
   a main turbine having a plurality of turbine blades rotated by an energy produced by combustion gas burned in the combustor;
   a heat recovery boiler configured to produce steam by heat exchange with the combustion gas discharged from the main turbine; and
   a fluid accelerator supplied with a first fluid compressed in the compressor to compress the first fluid and supply the compressed first fluid to the combustor,
   wherein the fluid accelerator comprises
     a first inlet through which the first fluid supplied from the compressor is introduced,
     a second inlet through which a second fluid having a higher pressure than the first fluid is introduced, and
     an outlet through which the first and second fluids are mixed and discharged,
   wherein the first inlet s connected to a first connection line through which the first fluid is delivered to the fluid accelerator, and a first refrigerant supply unit is installed to the first connection line to inject a refrigerant for cooling the first fluid into the first connection line.

2. The gas turbine of claim 1, wherein the combustor comprises a duct assembly in which the combustion gas flows,
   the duct assembly has a double-tube structure to define a cooling passage therein, and
   the gas turbine further comprises a discharge line connecting the cooling passage to the outlet.

3. The gas turbine of claim 1, wherein the second fluid has a lower temperature and a higher pressure than the first fluid.

4. The fuel supply device according to claim 1, wherein the pressure of the second fluid is 1.5 to 2.5 times that of the first fluid, and the temperature of the second fluid is 0.4 to 0.75 times that of the first fluid.

5. The gas turbine of claim 1, further comprising
   a first connection line connecting the compressor to the fluid accelerator.

6. The gas turbine of claim 1, further comprising
   a differential chamber accommodating the air discharged from the compressor therein, and
   a first connection line connecting the differential chamber to the fluid accelerator.

7. The gas turbine of claim 1, wherein:
the combustor comprises a duct assembly in which the combustion gas flows, the duct assembly having a double-tube structure to define a cooling passage therein; and
the gas turbine further comprises a first connection line connecting the downstream side of the cooling passage to the fluid accelerator to supply the compressed air to the fluid accelerator, and a discharge line connecting the upstream side of the cooling passage to the outlet.

8. The gas turbine of claim 1, further comprising a second connection line connecting the heat recovery boiler to the fluid accelerator to supply the steam from the heat recovery boiler to the fluid accelerator.

9. The gas turbine of claim 1, wherein the fluid accelerator comprises
a jet nozzle into which the second fluid is introduced, a suction chamber into which the first fluid is introduced,
a mixing section in which the first and second fluids are mixed with each other, and
a diffuser from which the mixed fluid is discharged.

10. The gas turbine of claim 1, wherein the fluid accelerator comprises
an inflow guide into which the first fluid is introduced, the inflow guide being formed such that its inner diameter decreases in a flow direction of air, a distribution passage into which the second fluid is introduced, the distribution passage extending in an annular form,
a plurality of induction passages connected to the distribution passage and the inflow guide, and
a diffuser from which the mixed first and second fluids are discharged.

11. The gas turbine of claim 10, wherein a guide curved surface is formed between the induction passages and the diffuser to induce a flow of the second fluid.

12. A gas turbine comprising:
a compressor configured to compress air introduced thereinto;
a combustor configured to mix the compressed air with fuel to make a mixture of the compressed air and the fuel, wherein the mixture is used for combustion;
a main turbine having a plurality of turbine blades rotated by an energy produced by combustion gas burned in the combustor;
a heat recovery boiler configured to produce steam by heat exchange with the combustion gas discharged from the main turbine; and
a fluid accelerator supplied with a first fluid compressed in the compressor to compress the first fluid and supply the compressed first fluid to the combustor,
wherein the fluid accelerator comprises
a first inlet through which the first fluid supplied from the compressor introduced,
a second inlet through which a second fluid having a higher pressure than the first fluid is introduced, and
an outlet through which the first and second fluids are mixed and discharged,
wherein the first inlet is connected to a first connection line throug which the first fluid is delivered to the fluid accelerator, and a first refrigerant supply unit is installed to the first connection line to inject a refrigerant for cooling the first fluid into the first connection line,
wherein the outlet is connected to a discharge line through which the mixed fluid is delivered to the combustor, a second refrigerant supply unit is installed to the discharge line to inject a refrigerant into the discharge line, and a flow rate of the refrigerant injected by the first refrigerant supply unit is larger than that of the refrigerant injected by the second refrigerant supply unit.

* * * * *